United States Patent Office 3,337,658
Patented Aug. 22, 1967

3,337,658
METHOD FOR THE MANUFACTURE OF S-SUBSTITUTED PHOSPHORO-DICHLORIDOTHIOATES
Herman O. Senkbeil and Kenneth C. Kauer, Midland, Mich., assignors to The Dow Chemical Company, Midland, Mich., a corporation of Delaware
No Drawing. Filed Apr. 27, 1964, Ser. No. 362,987
12 Claims. (Cl. 260—989)

The present invention is directed to an improved method for the production of S-substituted phosphorodichloridothioates corresponding to the formula:

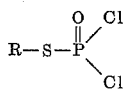

In this and succeeding formulae, R represents an aliphatic or halo-aliphatic radical containing up to six carbon atoms. Thus, R represents acyclic aliphatic hydrocarbon radicals and halogen-substituted acyclic aliphatic hydrocarbon radicals containing up to six carbon atoms. Representative radicals include alkyl, haloalkyl, allyl, methallyl, butenyl, haloallyl, propargyl, butynyl, pentenyl and pentynyl. The S-substituted phosphorodichloridothioates are liquid materials which are somewhat soluble in many common organic liquids and of low solubility in water. The compounds are useful in accordance with known methods as intermediates for the production of triester and diester monoamido phosphorus derivatives. In such methods, the S-substituted phosphorodichloridothioates are reacted with an alkali metal alcoholate to introduce two esterifying groups into the molecule or successively with an alkali metal alcoholate and ammonia or an amine to introduce one esterifying group and one amido group into the molecule. The thio-ester phosphorodichloridothioates and the triester and diester monoamido products obtained therefrom are useful as parasiticides and adapted to be employed as active constituents of compositions for the control of many pests such as mites, aphids, beetles, flies and worms.

The new and improved method comprises the isomerization of the O-substituted phosphorodichloridothioates corresponding to the formula:

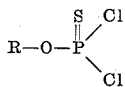

In such method, the isomerization is effected by warming the O-substituted phosphorodichloridothioates at a temperature of from 60° to 150° C. Oftentimes, it is convenient to operate at the boiling temperature of the reaction mixture and under reflux. The isomerization conveniently may be carried out in a solvent and is catalyzed when carried out in the presence of a catalytic amount of a tertiary amine or its mineral acid salt. In carrying out the method, an O-methyl phosphorodichloridothioate or O-ethyl phosphorodichloridothioate or their halogen derivatives are heated at a temperature of at least 60° C. to effect the isomerization and the production of the corresponding and desired thio-ester compounds. In a further embodiment of the present invention, the O-substituted phosphorodichloridothioates (R—O—P(S)Cl₂) are heated in the presence of a tertiary amine or its mineral acid salts to produce the corresponding thioester compounds. Upon completion of the isomerization reaction, the desired product can be separated and purified by fractional distillation under reduced pressure.

Where it is desired to produce an S-substituted phosphorodichloridothioate containing more than two carbon atoms in the esterifying moiety, it is critical and essential that the isomerization be carried out in the presence of a tertiary amine or its mineral acid salt as catalyst. When operating in the absence of the catalyst, no substantial yields of these thio-esters are obtained. For the production of the thio-esters containing up to three carbon atoms in the esterifying moiety, good results are obtained when employing the catalyst in an amount of about 0.1 percent by weight, based upon the weight of the employed O-substituted phosphorodichloridothioate. In such operations, yields of thio-esters are obtained substantially improved in the amount of about 15 to 20 percent over the yields when operating in the absence of a catalyst. For the production of the products containing more than three carbon atoms in the esterifying moiety, the catalyst is employed in amounts up to 10 percent or more by weight, the preferred amount being in the range of from 0.5 to 10 percent by weight and being directly proportional to the length of the carbon chain in the esterifying moiety of the starting material. Suitable catalysts include trialkylamines, N,N-dimethyl aniline, pyridine, lutidine, picoline and their substitution products and mineral acid salts such as triethylamine, quinoline, tripropylamine, tributylamine, dipropylmonoethylamine, diethylmonopropylamine, N,N-diethyl aniline, N,N-dipropyl aniline, N,N-dibutyl aniline and so forth. Suitable mineral acid salts include the salts of the foregoing materials with hydrochloric acid, sulfuric acid, nitric acid and hydrobromic acid. Preferred tertiary amine catalysts as above defined include the tri(loweralkyl)amines and di(loweralkyl)anilines, pyridine, lutidine, picoline and/or the mineral acid salts of such tertiary amines. In the present specification and claims, "loweralkyl" is employed to refer to alkyl radicals containing from 1 to 2 or 3 or 4 or 5 carbon atoms, inclusive, or 1 or 2 or 3 or 4 or 5 carbon atoms.

The employment in the present method of temperatures of at least 60° C. is critical for the practice of the invention and the production of the thio-esters. The isomerization is preferably carried out at temperatures of from 70° to 140° C. The exact temperature to be employed is somewhat dependent upon the nature of the starting material. Thus, with the starting materials containing up to three carbon atoms in the esterifying moiety, good results are obtained when employing temperatures preferably of from 70° to 110° C. For the starting materials containing a longer carbon chain in the esterifying moiety, good results are obtained when employing temperatures preferably of from 110° to 140° C. It is essential that temperatures significantly above the specified range not be employed for any appreciable period of time as they materially reduce the yield of the desired thio-ester product.

The rate at which the formation of the S-substituted phosphorodichloridothioate esters takes place has been found to vary directly with the employed temperature, the longer periods usually being employed in the lower temperatures. When operating under preferred conditions, the reaction is generally complete in about an hour.

The following examples merely illustrate the present invention and are not to be construed as limiting.

*Example 1.—S-methyl phosphorodichloridothioate*

O-methyl phosphorodichloridothioate (boiling at 45° C. at 10 millimeters pressure; refractive index n/D of 1.5249 at 25° C.) was heated with stirring at a temperature of from 88° to 90° C. for 4.5 hours. Stirring was thereafter continued and the temperature raised to 100° C. and maintained at from 100° to 104° C. for 2.25 hours. Following the heating period, the reaction mixture was fractionally distilled under reduced pressure to obtain an S-methyl phosphorodichloridothioate product in a yield of 76 percent.

Example 2.—S-ethyl phosphorodichloridothioate

O-ethyl phosphorodichloridothioate (boiling at 62°–68° C. at 12 millimeters pressure; refractive index n/D of 1.5012 at 25° C.) was heated with stirring for 5.25 hours at a temperature of from 128° to 131° C. Following the heating period, the reaction mixture was fractionally distilled under reduced pressure to obtain an S-ethyl phosphorodichloridothioate product in a yield of about 55 percent.

Example 3.—S-propyl phosphorodichloridothioate

O-propyl phosphorodichloridothioate (boiling at 64°–65° C. at 10 millimeters pressure; refractive index n/D of 1.3022 at 25° C.) was mixed with triethylamine hydrochloride in the amount of 0.5 percent by weight of the phosphorodichloridothioate and the resulting mixture heated for 5 hours at a temperature of 110° C. As a result of these operations, there was obtained an S-propyl phosphorodichloridothioate product in a yield of 73 percent.

In a similar manner, O-propyl phosphorodichloridothioate was separately isomerized in the presence of N,N-dimethyl aniline, pyridine and 2,4-lutidine. In such operations, the pyridine and 2,4-lutidine were employed in the amount of 0.25 percent and the N,N-dimethyl aniline in the amount of 10 percent by weight of the O-propyl phosphorodichloridothioate starting material. Following the heating period, the same very desirable yields of the S-propyl phosphorodichloridothioate product were obtained.

Example 4

O-methyl phosphorodichloridothioate was mixed with 0.5 percent by weight of triethylamine as based upon the amount of the phosphorodichloridothioate and the resulting mixture heated with stirring at 80° C. for a period of 4 hours. Fractional distillation of this reaction mixture gave an S-methyl phosphorodichloridothioate product in a yield of 90 percent.

Example 5.—S-(2-propynyl) phosphorodichloridothioate

Triethylamine (101 grams; 1 mole) was added portionwise with stirring to a mixture of 339 grams (2.0 moles) of thiophosphoryl chloride and 56 grams (1.0 mole) of propargyl alcohol dissolved in 500 milliliters of benzene to produce an O-(2-propynyl) phosphorodichloridothioate product. The addition was carried out over a period of three hours and at a temperature of from 0° to 6° C. Stirring was thereafter continued for three hours at a temperature of from 0° to 1° C. to complete the reaction. The reaction mixture was then filtered and the benzene removed from the filtrate by evaporation under reduced pressure to obtain an O-propynyl phosphorodichloridothioate product containing at least 0.5 percent by weight of triethylamine and its salts. A sample of the solvent-free product was heated at a temperature of from 70° to 80° C. with stirring for one hour. As a result of these operations, there was obtained an outstanding yield of an S-(2-propynyl) phosphorodichloridothioate product.

The same desirable yields of other S-substituted phosphorodichloridothioates are obtained in similar procedures as follows:

S-pentyl phosphorodichloridothioate (molecular weight of 221; sulfur content of 14.45) by heating O-pentyl phosphorodichloridothioate at a temperature of 125° C. in the presence of 5 percent by weight of triethylamine.

S-(2-chloroethyl) phosphorodichloridothioate (molecular weight of 213.5; sulfur content of 15.0) by heating O-(2-chloroethyl) phosphorodichloridothioate at a temperature of 120° C. and in the presence of 0.1 percent dipropylmonoethylamine.

S-allyl phosphorodichloridothioate (molecular weight of 191; sulfur content of 16.75) by heating O-allyl phosphorodichloridothioate at a temperature of 70° C. and in the presence of 0.1 percent of pyridine hydrochloride.

S-(3-chloroallyl) phosphorodichloridothioate (molecular weight of 225.5; sulfur content of 14.2) by heating O-(3-chloroallyl) phosphorodichloridothioate at a temperature of 60° C. and in the presence of 0.2 percent of pyridine.

S-(2-bromopropyl) phosphorodichloridothioate (molecular weight of 272; sulfur content of 11.78) by heating O-(2-bromopropyl) phosphorodichloridothioate at a temperature of 125° C. and in the presence of 0.5 percent of triethylamine sulfate.

S-vinyl phosphorodichloridothioate (molecular weight of 177; sulfur content of 18.1) by heating O-vinyl phosphorodichloridothioate at a temperature of 70° C. and in the presence of 0.1 percent of triethylamine.

S-(3-chloropropyl) phosphorodichloridothioate (molecular weight of 227.5; sulfur content of 14.08) by heating O-(3-chloropropyl) phosphorodichloridothioate at a temperature of 130° C. and in the presence of 0.1 percent of lutidine.

S-(2-chlorobutyl) phosphorodichloridothioate (molecular weight of 241.5; sulfur content of 13.25) by heating O-(2-chlorobutyl) phosphorodichloridothioate at a temperature of 130° C. and in the presence of 8 percent of collidine.

S-(2-butenyl) phosphorodichloridothioate (molecular weight of 205; sulfur content of 15.6) by heating O-(2-butenyl) phosphorodichloridothioate at a temperature of 80° C. and in the presence of 3 percent of pyridine.

S-butyl phosphorodichloridothioate by heating O-butyl phosphorodichloridothioate (molecular weight of 207; sulfur content of 15.48) by heating O-butyl phosphorodichloridothioate at a temperature of 130° C. in the presence of 10 percent of triethylamine hydrochloride.

S-pentyl phosphorodichloridothioate by heating O-pentyl phosphorodichloridothioate at a temperature of 120° C. in the presence of 6 percent by weight of quinoline hydrochloride.

The O-substituted phosphorodichloridothioates employed as starting materials in accordance with the present teachings are prepared in known methods wherein an alkali metal salt of a suitable alcohol is reacted with an excess of phosphorous thiochloride. The desired product is separated by conventional procedures and conveniently by filtration and subsequent evaporation of any starting materials from the filtrate.

This is a continuation-in-part of our copending application Ser. No. 148,751, filed Oct. 30, 1961, and now abandoned.

What is claimed is:

1. A method for the manufacture of an S-substituted phosphorodichloridothioate having the formula

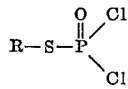

which comprises heating an O-substituted phosphorodichloridothioate having the formula

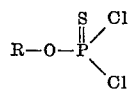

at a temperature of from 60° to 150° C. and in the presence of a catalyst selected from the group consisting of a tertiary amine and its mineral acid salt; wherein, in the above formula, R represents a member of the group consisting of an acyclic aliphatic hydrocarbon radical and chlorine or bromine substituted acyclic aliphatic hydrocarbon radical containing up to 6 carbon atoms.

2. A method for the production of an S-substituted phosphorodichloridothioate corresponding to the formula

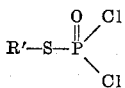

which comprises heating an O-substituted phosphorodichloridothioate having the formula

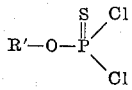

at a temperature of from 60° to 140° C.; wherein, in the above formula, R' represents a member of the group consisting of an acyclic aliphatic hydrocarbon radical and chlorine or bromine substituted acyclic aliphatic hydrocarbon radicals containing from one to two carbon atoms.

3. A method for the manufacture of an S-substituted phosphorodichloridothioate having the formula

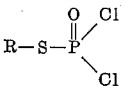

which comprises heating an O-substituted phosphorodichloridothioate having the formula

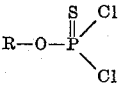

at a temperature of from 60° to 150° C. and in the presence of a catalyst selected from the group consisting of a tri(loweralkyl)amine, di(loweralkyl)aniline, pyridine, lutidine, picoline, quinoline and a mineral acid salt of such tertiary amine; wherein, in the above formula, R represents a member of the group consisting of an acyclic aliphatic hydrocarbon radical and chlorine or bromine substituted acyclic aliphatic hydrocarbon radical containing up to 6 carbon atoms.

4. A method for the manufacture of an S-substituted phosphorodichloridothioate having the formula

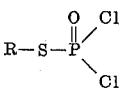

which comprises heating an O-substituted phosphorodichloridothioate having the formula

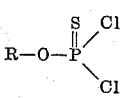

at a temperature of from 60° to 150° C. and in the presence of a catalyst selected from the group consisting of a tri(loweralkyl)amine, di(loweralkyl)aniline, pyridine, lutidine, picoline and quinoline; wherein, in the above formula, R represents a member of the group consisting of an acyclic aliphatic hydrocarbon radical and chlorine or bromine substituted acyclic aliphatic hydrocarbon radical containing up to 6 carbon atoms.

5. A method for the production of an S-substituted phosphorodichloridothioate corresponding to the formula

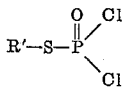

which comprises heating an O-substituted phosphorodichloridothioate having the formula

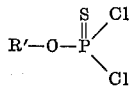

at a temperature of from 60° to 150° C. and in the presence of a catalyst selected from the group consisting of a tri(loweralkyl)amine, di(loweralkyl)aniline, pyridine, lutidine, picoline and a mineral acid salt of such tertiary amine; wherein, in the above formula, R' represents a member of the group consisting of an acyclic aliphatic hydrocarbon radical and chlorine or bromine substituted acyclic aliphatic hydrocarbon radical containing from 1 to 2 carbon atoms.

6. A method claimed in claim 2 wherein the O-substituted phosphorodichloridothioate is O-methyl phosphorodichloridothioate.

7. A method claimed in claim 2 wherein the O-substituted phosphorodichloridothioate is O-ethyl phosphorodichloridothioate.

8. A method claimed in claim 1 wherein the O-substituted phosphorodichloridothioate is O-propyl phosphorodichloridothioate.

9. A method claimed in claim 1 wherein the O-substituted phosphorodichloridothioate is O-methyl phosphorodichloridothioate.

10. A method claimed in claim 1 wherein the O-substituted phosphorodichloridothioate is O-allyl phosphorodichloridothioate.

11. A method claimed in claim 5 wherein the O-substituted phosphorodichloridothioate is O-methyl phosphorodichloridothioate.

12. A method claimed in claim 5 wherein the O-substituted phosphorodichloridothioate is O-ethyl phosphorodichloridothioate.

References Cited

UNITED STATES PATENTS

| | | | |
|---|---|---|---|
| 2,601,219 | 6/1952 | Morrill | 260—989 |
| 2,911,430 | 11/1959 | Fitch | 260—945 |
| 3,005,003 | 10/1961 | Ford-Moore et al. | 260—982 |

OTHER REFERENCES

Angewandte Chem., vol. 71, Feb. 1959, Hilgetag, pp. 137–138.

Calderbank: "J. Chem. Soc." (London), pp. 627–642 (Feb. 1960) et al.

Godovikov et al. "Zhur. Obschei Khim.," vol. 31, pp. 1628–1631 (May 1961).

CHARLES B. PARKER, *Primary Examiner.*

FRANK M. SIKORA, BERNARD BILLIAN,

*Assistant Examiners.*